(12) United States Patent
Gremaud et al.

(10) Patent No.: US 7,264,663 B2
(45) Date of Patent: *Sep. 4, 2007

(54) INK SET FOR INK JET PRINTING

(75) Inventors: Jean-Luc Gremaud, Farvagny (CH); Arnd Kriebel, Marly (CH)

(73) Assignee: Ilford Imaging Switzerland GmbH (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/090,134

(22) Filed: Mar. 23, 2005

(65) Prior Publication Data
US 2005/0211134 A1 Sep. 29, 2005

(30) Foreign Application Priority Data
Mar. 25, 2004 (EP) .................................. 04405184

(51) Int. Cl.
C09D 11/02 (2006.01)
(52) U.S. Cl. ............... 106/31.48; 106/31.51; 106/31.49; 106/31.52; 106/31.5
(58) Field of Classification Search ............. 106/31.48, 106/31.51, 31.49, 31.52, 31.5
See application file for complete search history.

(56) References Cited
U.S. PATENT DOCUMENTS

| 5,969,115 A | 10/1999 | Peter |
| 6,053,969 A * | 4/2000 | Lauw et al. ............. 106/31.27 |
| 6,068,687 A | 5/2000 | Baettig et al. |
| 6,265,554 B1 | 7/2001 | Lehmann et al. |
| 6,320,031 B1 | 11/2001 | Baettig et al. |

(Continued)

FOREIGN PATENT DOCUMENTS
CH         692 580 A5      8/2002

(Continued)

OTHER PUBLICATIONS

"Color Science: Concepts and Methods, Quantitative Data and Formulae," Wiley-Interscience, 165-169 and 829 (1982) ISBN 0-471-02106-7, no month available.

*Primary Examiner*—Helene Klemanski
(74) *Attorney, Agent, or Firm*—Onofrio Law; Dara L. Onofrio, Esq.

(57) ABSTRACT

Ink set for ink jet printing consisting of at least one yellow ink, one magenta ink, one cyan ink and one black ink, wherein the magenta ink contains, as first dye component, at least one dye of formula (I)

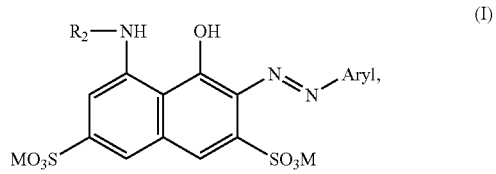

(I)

wherein $R_2$ and Aryl are as defined in the specification, or of formula (II)

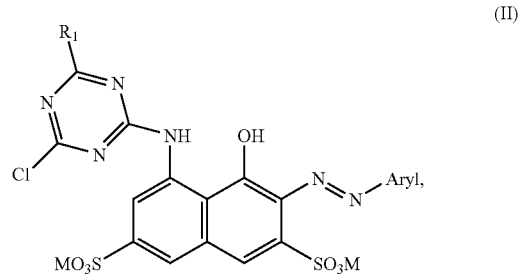

(II)

wherein M, $R_1$ and Aryl are as defined in the specification and, as second dye component, at least one copper complex azo dye of formula (III)

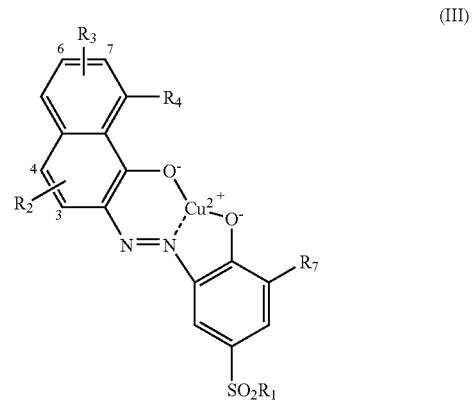

(III)

or of formula (IV)

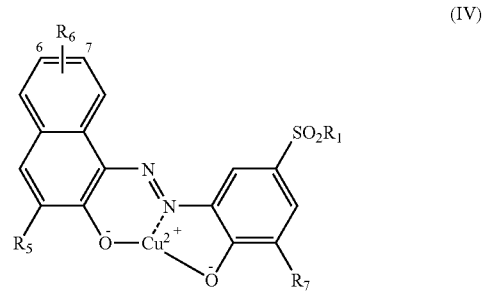

(IV)

wherein M, $R_1$, $R_2$, $R_3$, $R_4$, $R_5$, $R_6$ and $R_7$ are as defined in the specification.

10 Claims, No Drawings

U.S. PATENT DOCUMENTS

| | | | |
|---|---|---|---|
| 6,379,442 B1 * | 4/2002 | Lavery et al. | 106/31.51 |
| 6,521,032 B1 | 2/2003 | Lehmann et al. | |
| 6,824,598 B2 * | 11/2004 | Thornberry et al. | 106/31.27 |
| 6,843,838 B2 * | 1/2005 | Zimmer et al. | 106/31.27 |
| 6,991,676 B2 * | 1/2006 | Kabalnov et al. | 106/31.48 |
| 2002/0017218 A1 | 2/2002 | Baettig et al. | |
| 2002/0121221 A1 | 9/2002 | Baettig | |
| 2003/0221588 A1 | 12/2003 | Baettig et al. | |
| 2004/0068103 A1 | 4/2004 | Baettig | |
| 2005/0011406 A1 * | 1/2005 | Kabalnov et al. | 106/31.49 |
| 2005/0087099 A1 * | 4/2005 | Blease et al. | 106/31.27 |
| 2005/0160937 A1 * | 7/2005 | Gremaud et al. | 106/31.48 |

FOREIGN PATENT DOCUMENTS

| | | |
|---|---|---|
| EP | 0 366 121 A2 | 5/1990 |
| EP | 0 755 984 A1 | 1/1997 |
| EP | 0 895 033 A1 | 8/1998 |
| EP | 0 902 064 A1 | 3/1999 |
| EP | 0 918 074 A1 | 5/1999 |
| EP | 0 924 263 A1 | 6/1999 |
| EP | 0 982 371 A1 | 3/2000 |
| EP | 1 086 993 A1 | 3/2001 |
| EP | 1 086 999 A2 | 3/2001 |
| EP | 1 160 291 A1 | 12/2001 |
| EP | 1 219 682 A1 | 7/2002 |
| EP | 1 367 098 A1 | 12/2003 |
| EP | 1 403 328 A1 | 3/2004 |
| WO | WO96/24636 | 8/1996 |

* cited by examiner

INK SET FOR INK JET PRINTING

FIELD OF THE INVENTION

The present invention relates to aqueous ink sets for ink jet printing comprising, in the magenta inks, at least one metal free azo dye with an incorporated H-acid moiety in their molecular structure as a first dye component and at least one copper complex azo dye as the second dye component.

BACKGROUND OF THE INVENTION

Ink jet printing has already replaced or supplemented in many fields classic image reproduction methods such as photography on silver halide materials, offset printing and screen printing. It is used in office surroundings, in the photographic field, in the graphic field, especially in proofing, in the production of colored textile materials or in industrial environments. In ink jet printing, extremely small ink droplets are expelled through the nozzles of a printing head and are deposited on a recording medium, using digital image data. The inks used therein consist of solutions or dispersions of colored or black dyes or pigments in a liquid vector. The liquid vector consists, depending on the type of the dye or the pigment, of water, of mixtures of water with water-miscible organic solvents, of mixtures of exclusively organic solvents, of oils or of hydrophobic organic solvents.

Ink jet printing has attained a remarkable degree of maturity. For very demanding applications in the graphic field and the photographic field, however, further improvements are necessary. In these fields, the light stability and the volume of the color space (gamut) are extremely important. Both properties are crucially influenced by the constitution of the dyes or pigments that are used. Pigments normally show a better light stability than soluble dyes. In most cases, however, dyes have a higher brilliance and therefore show more brilliant colors. Furthermore, pigments have a tendency to stay on the surface of the printed medium and therefore to reduce the gloss of the surface. This is not desirable especially for photographic applications of ink jet printing.

Up to now, dye based inks offer a considerably better reproduction of brilliant colors. For applications where a high brilliance of the colors is needed, inks containing dyes and not pigments are preferentially used. Generally, the use of dye-based inks also gives a cost advantage, because in most cases dyes are cheaper than pigments.

In ink sets for demanding applications such as in the graphic field, in photography or in proofing applications, the most brilliant available dyes have to be used. These dyes must show, besides good water fastness and high diffusion fastness, an excellent light stability.

The simplest ink set consists of one yellow ink, one magenta ink, one cyan ink and one black ink. The three colored inks (primary colors) allow, by superposition, the reproduction of the secondary colors such as red, blue and green and of all intermediate colors.

Inks for ink jet printing need to satisfy stringent requirements. They need to show excellent properties with regard to chemical and physical stability, toxicity and rheology. They are neither allowed to corrode the constituents of the printing heads, nor to clog the nozzles or to form deposits on the heating elements of thermal printing heads. On the recording sheets, however, the inks need to dry quickly and the dyes are, for example, not allowed to diffuse, they need to be light stable and they are not allowed to deteriorate or bleach when the printed images are stored in contaminated air. Furthermore, they are not allowed to reduce the gloss of the recording sheets or to disturb the process of lamination of such printed recording sheets. The choice of suitable dyes for high quality ink jet printing is strongly limited by these requirements. Only a few of all known dyes more or less fulfill all the requirements asked for in high quality ink jet printing. Probably no dye exists that fulfills all these requirements completely.

The best water-soluble magenta dyes for ink jet printing are among the group consisting of γ-acid azo dyes, H-acid azo dyes and copper complex azo dyes.

Metal free azo dyes with an incorporated γ-acid moiety in their molecular structure are described for example in patent applications WO 96/24,636, EP 0,755,984 and EP 1,160,291. These dyes show a very good light fastness on polymer based recording sheets. On nanoporous recording sheets, however, their light fastness is not very good and their stability in contaminated ambient air is insufficient.

Metal free azo dyes with an incorporated H-acid moiety in their molecular structure are described for example in patent applications EP 0,918,074, EP 1,219,682 and EP 1,367,098. The most brilliant magenta dyes are found in this class. On nanoporous recording sheets, these dyes show good light fastness as well as good stability in contaminated ambient air. However, on polymer based recording sheets, their light fastness is lower in comparison with magenta dyes with an incorporated γ-acid moiety in their molecular structure or with the copper complex azo dyes mentioned below.

Metal complex azo dyes may also be used. Copper is the preferred metal. Such copper containing dyes are described for example in patent applications EP 1,086,993, EP 1,086,999 and EP 1,403,328. These dyes show good light fastness on polymer based recording sheets and on nanoporous recording sheets. On nanoporous recording sheets, they show a good stability in contaminated ambient air. However, their brilliance is lower in comparison with magenta dyes having a γ-acid moiety in their molecular structure or having a H-acid moiety in their molecular structure.

Nickel complex dyes are described in patent application EP 0,902,064. These dyes, however, are questionable from an ecologic or toxicological point of view.

SUMMARY OF THE INVENTION

An objective of the invention is to provide ink sets for high quality ink jet printing with improved magenta inks in the case where polymer based recording sheets or nanoporous recording sheets are used. This objective is attained with magenta inks containing, as a first dye component, at least one metal free azo dye with an incorporated H-acid moiety in its molecular structure and, as the second dye component, at least one copper complex azo dye. It is important that the metal free azo dye does not form stable copper complexes. Otherwise, the brilliance of the metal free azo dye with an incorporated H-acid moiety in its molecular structure would be reduced. Preferably, the metal free azo dye with an incorporated H-acid moiety in its molecular structure does not form stable copper complexes at all.

The magenta inks according to the invention give images showing good light fastness, high brilliance and, on nanoporous recording sheets, an improved stability in contaminated ambient air.

The mixing ratio of the first dye component (metal free azo dye with an incorporated H-acid moiety in its molecular structure) and the second dye component (copper complex azo dye) is from 1:100 to 100:1. Within these mixing ratios, all hues between the hues of the pure dyes may be obtained.

Dyes very often are characterized by their position in color space. Normally the CIE (L*a*b*) system of 1976 is used. A definition is given for example on pages 164 to 169 and 829 of the book by G. Wyszecki and W. S. Stiles, "Color Science: Concepts and Methods, Quantitative Data and Formulae", 2nd edition, Wiley-Interscience (1982), ISBN 0-471-02106-7. This system will be used in the following parts of the description of the invention.

DETAILED DESCRIPTION OF THE INVENTION

The invention relates to ink sets for ink jet printing of colored images using commercially available ink jet printers such as desk top printers or wide format printers. All types of ink jet printers may be used, such as thermal ink jet printers (bubble jet), piezo printers or continuous ink jet printers.

Such ink sets consist of at least one yellow ink, one magenta ink, one cyan ink and one black ink. Inks with lower dye concentrations may be used in addition. This improves the reproduction of dark and light parts of the images. It is also possible to include inks having other colors in order to improve color reproduction.

Suitable dyes for the first dye component of the magenta inks of the ink sets according to the invention are described for example in patent applications EP 0,918,074, EP 1,219,682 and EP 1,367,098.

As first dye component, preferred azo dyes with an incorporated H-acid moiety in their molecular structure, are the dyes of general formula (I)

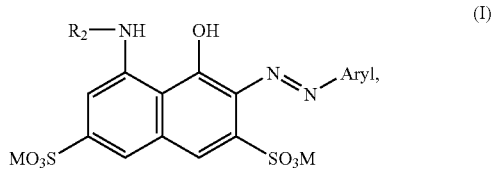

wherein

M represents hydrogen, a metal atom or ammonium;

$R^2$ represents $COD_1$, where
  $D_1$ represents unsubstituted or substituted alkyl, where the substituents are selected from the group consisting of $OCH_3$ and COOM; unsubstituted phenyl or phenyl substituted with $OH_3$, Cl, Br, OH or COOM;
or
represents $SO_2D_2$, where
  $D_2$ represents unsubstituted alkyl, unsubstituted phenyl or phenyl substituted with $CH_3$, F, Cl or Br and Aryl represents unsubstituted phenyl or phenyl substituted with $CH_3$, Cl, Br, COOM or $SO_3M$ or unsubstituted naphthyl or naphthyl substituted with COOM or $SO_3M$, or the dyes of general formula (II)

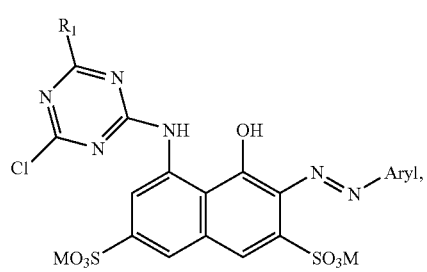

wherein

M represents hydrogen, a metal atom or ammonium;

$R_1$ represents $NR_3R_4$, where
  $R_3$ and $R_4$ independently represent hydrogen; alkyl, substituted alkyl, where the substituents are selected from the group consisting of OH, $OCH_3$, COOM and $SO_3M$; aralkyl; unsubstituted aryl or substituted aryl, where the substituents are selected from the group consisting of $OCH_3$, Cl, Br, COOM and $SO_3M$;
or
represents $OR_5$, where
  $R_5$ represents hydrogen or alkyl;
or
represents $SR_6$, where
  $R_6$ represents alkyl or alkyl substituted with COOM, OH or $SO_3M$ and Aryl represents unsubstituted phenyl or phenyl substituted with $CH_3$, Cl, Br, COOM or $SO_3M$ or unsubstituted naphthyl or naphthyl substituted with COOM or $SO_3M$.

Especially preferred are the dye "Magenta H-1" of formula

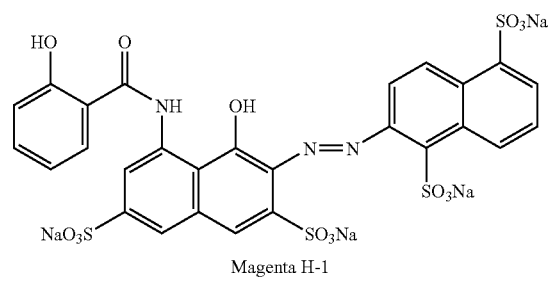

Magenta H-1 and the dye "Magenta H-2" of formula

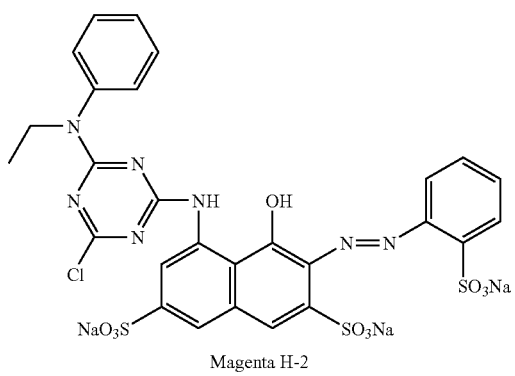

Magenta H-2 or a mixture of these dyes.

As second dye component of the magenta ink, the preferred dyes are copper complex dyes described in patent application EP 1,403,328 of general formula (III)

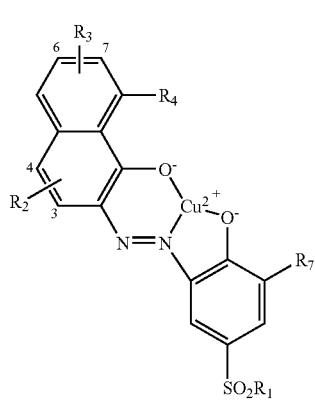
(III)

or of general formula (IV)

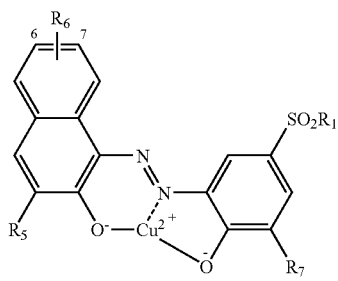
(IV)

wherein

M represents hydrogen, a metal atom or optionally substituted ammonium;

$R_1$ represents alkyl with 1 to 4 carbon atoms, substituted alkyl with 2 to 4 carbon atoms, where the substituents are selected from the group consisting of OH and $OSO_3$; or alkenyl with 2 to 4 carbon atoms;

$R_2$ represents hydrogen or $SO_3M$;

$R_3$ represents hydrogen, $SO_3M$, $NH_2$, $NHCOD_1$, where $D_1$ represents unsubstituted or substituted alkyl with 1 to 6 carbon atoms, where the substituents are selected from the group consisting of COOM, Cl and Br; unsubstituted phenyl or phenyl substituted with $CH_3$, Cl, Br, OH, COOM or $SO_3M$; or $NHSO_2D_2$, where $D_2$ represents unsubstituted alkyl with 1 to 6 carbon atoms, unsubstituted phenyl or phenyl substituted with $CH_3$, F, Cl or Br;

$R_4$ represents hydrogen, $SO_3M$, $NH_2$, $NHSO_2D_3$, where $D_3$ represents alkyl with 1 to 6 carbon atoms; unsubstituted phenyl or phenyl substituted with $CH_3$, F, Cl or Br;

$R_5$ represents hydrogen, $SO_3M$, COOM or $COND_4D_5$, where $D_4$ and $D_5$ independently represent hydrogen, unsubstituted or substituited alkyl with 1 to 6 carbon atoms, where the substituents are selected from the group consisting of $OCH_3$, $OC_2H_5$, iso-$OC_3H_7$ and OH;

$R_6$ represents hydrogen or $SO_3M$ and $R_7$ represents hydrogen or $SO_3M$.

Especially preferred are the copper complex azo dye "Magenta C-1" of formula

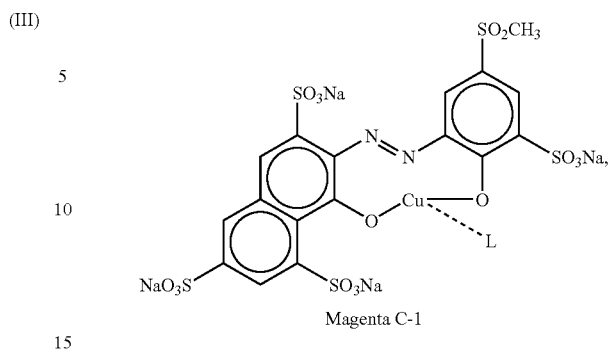
Magenta C-1 the copper complex azo dye "Magenta C-2" of formula

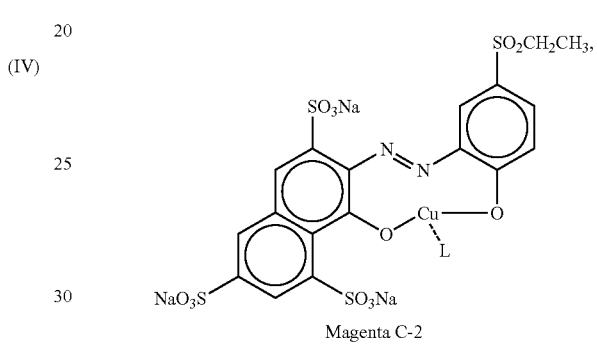
Magenta C-2 the copper complex azo dye "Magenta C-3" of formula

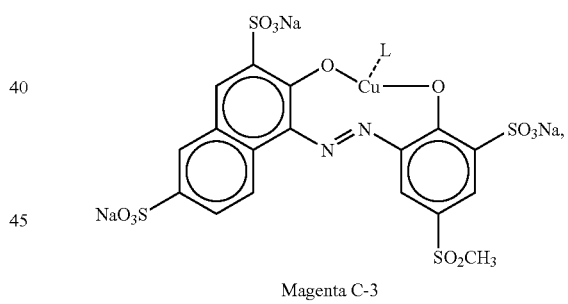
Magenta C-3 the copper complex azo dye "Magenta C-4" of formula

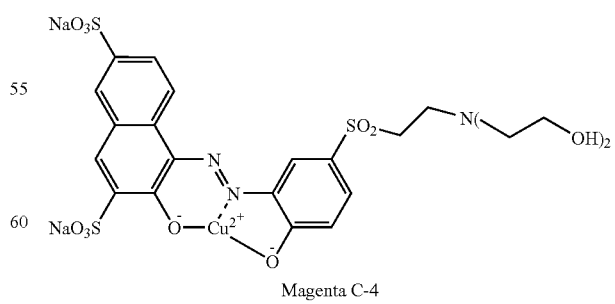
Magenta C-4 and the copper complex azo dye "Reactive Red 23" of formula

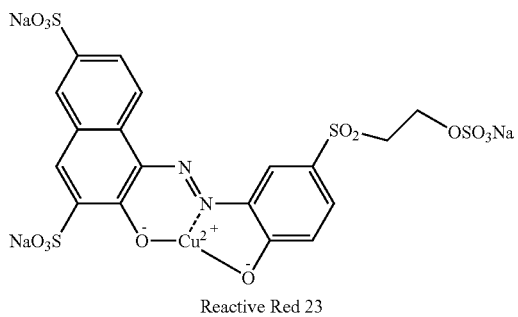

Reactive Red 23 or a mixture of these dyes, where L everywhere represents a copper ligand such as 2-aminoethanol.

Preferred is an ink set consisting of one yellow ink, one magenta ink, one cyan ink and one black ink, which comprises, in said magenta ink, at least one azo dye of general formulas (I) or (II) as first dye component and at least one copper complex azo dye of general formulas (III) or (IV) as second dye component.

Especially preferred is an ink set consisting of a yellow ink, a magenta ink, a cyan ink and a black ink, which comprises, in said magenta ink, the dye "Magenta H-1", the dye "Magenta H-2" or a mixture of these dyes as first dye component and the dye "Magenta C-1", the dye "Magenta C-2", the dye "Magenta C-3", the dye "Magenta C-4", the dye "Reactive Red 23" or a mixture of these dyes as second dye component.

Suitable dyes for the yellow inks of the ink sets according to the invention are described for example in patent application EP 0,755,984. Such yellow inks comprise at least one dye of general formula (V), or of general formula (VI)

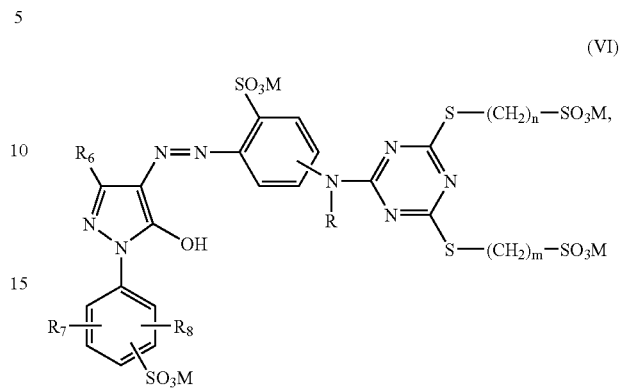

wherein

R represents hydrogen or alkyl with 1 to 6 carbon atoms;

M represents hydrogen or a metal atom or optionally substituted ammonium;

$R_6$ represents $CH_3$ or COOM;

$R_7$, $R_8$ independently represent hydrogen, Cl, Br or $CH_3$ and n, m are each independently from 2 to 6.

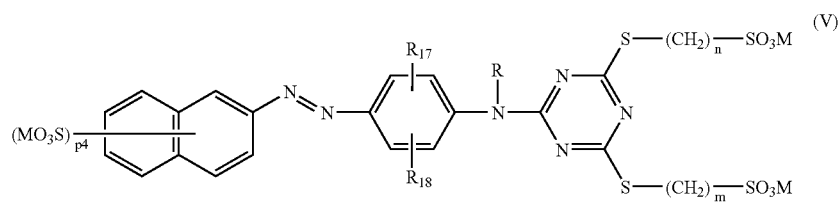

wherein

R represents hydrogen or alkyl having from 1 to 6 carbon atoms;

M represents hydrogen or a metal atom or ammonium optionally substituted by alkyl, alkoxyalkyl or hydroxyalkyl;

$R_{17}$, $R_{18}$ independently represent hydrogen, alkyl or alkoxy each having from 1 to 3 carbon atoms;

$p_4$ is from 1 to 3 and the sulfo group is in position 1, 4, 5, 6, 7 or 8 in the case where $p_4$ is equal to 1; the sulfo groups are in positions 4 and 8, 5 and 7, 6 and 8 or 1 and 5 in the case where $p_4$ is equal to 2; or the sulfo groups are in positions 3, 6 and 8 or 4, 6 and 8 in the case where $p_4$ is equal to 3 and n, m are each independently from 2 to 6,

Especially preferred are the dye "Yellow 1" of formula

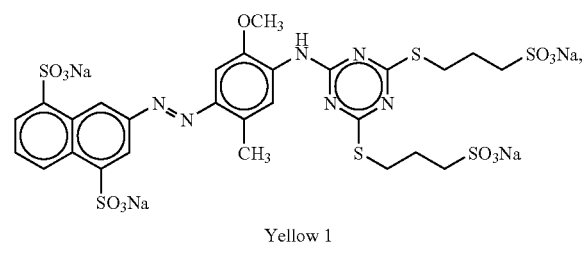

Yellow 1 the dye "Yellow 2"

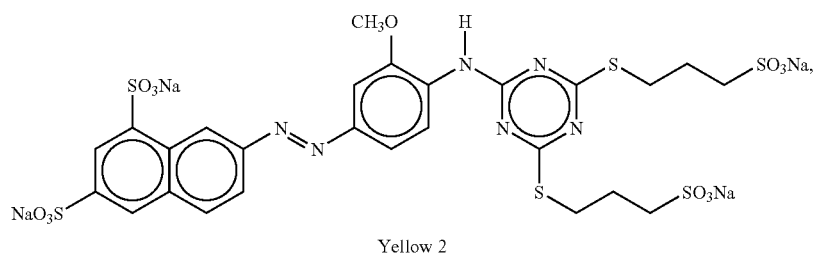

Yellow 2 the dye "Yellow 3"

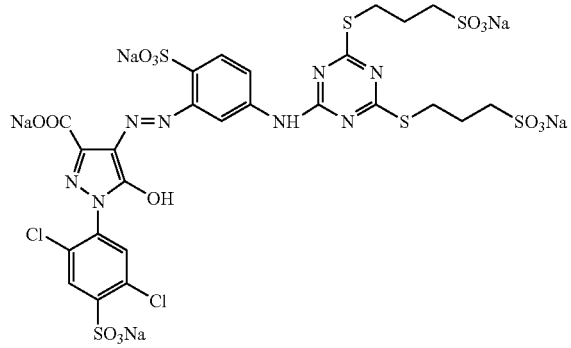

Yellow 3

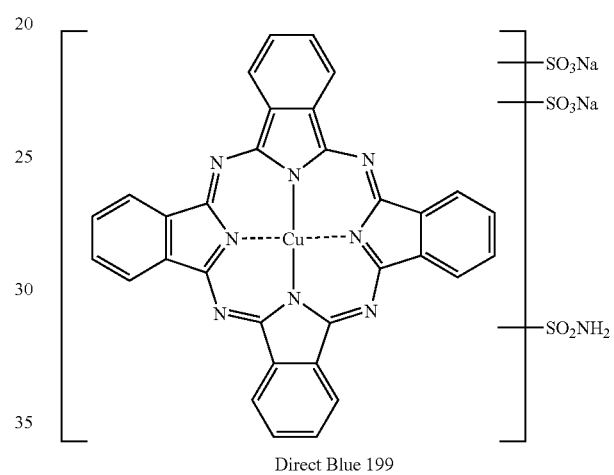

Direct Blue 199 or a mixture of these dyes.

Preferred is an ink set according to the invention consisting of a yellow ink, a magenta ink, a cyan ink and a black ink, which comprises, in said magenta ink, at least one azo dye of general formulas (I) or (II) as first dye component and at least one copper complex azo dye of general formulas (III) or (IV) as second dye component, and, in said yellow ink, a yellow dye of general formulas (V) or (VI).

Especially preferred is an ink set according to the invention consisting of a yellow ink, a magenta ink, a cyan ink and a black ink, which comprises, in said magenta ink, the dye "Magenta H-1", the dye "Magenta H-2" or a mixture of these dyes as first dye component, and the dye "Magenta C-1", the dye "Magenta C-2", the dye "Magenta C-3", the dye "Magenta C-4", the dye "Reactive Red 23" or a mixture of these dyes as second dye component, and, in said yellow ink, the dye "Yellow 1", the dye "Yellow 2", the dye "Yellow 3" or a mixture of these dyes.

In cyan inks for ink jet printing, copper phthalocyanine dyes are generally used.

An especially preferred dye for the cyan ink of the ink sets according to the invention is the dye "Direct Blue 199" of formula Differently substituted copper phthalocyanine dyes, with different numbers and positions of the substituents in the molecule may also be used.

Preferred is an ink set according to the invention consisting of a yellow ink, a magenta ink, a cyan ink and a black ink, which comprises, in said magenta ink, at least one azo dye of general formulas (I) or (II) as first dye component and at least one copper complex azo dye of general formulas (II) or (IV) as second dye component, and, in said cyan ink, the dye Direct Blue 199.

Especially preferred is an ink set according to the invention consisting of a yellow ink, a magenta ink, a cyan ink and a black ink, which comprises, in said magenta ink, the dye "Magenta H-1", the dye "Magenta H-2" or a mixture of these dyes as first dye component, and the dye "Magenta C-1", the dye "Magenta C-2", the dye "Magenta C-3", the dye "Magenta C-4", the dye "Reactive Red 23" or a mixture of these dyes as second dye component, and, in said cyan ink, the dye Direct Blue 199.

Suitable dyes for the black ink of the ink sets according to the invention are described for example in patent applications EP 0,859,033, EP 0,924,263 and EP 0,982,371 and in patent CH 692,580.

Especially preferred are the dyes "Black 1" of formula

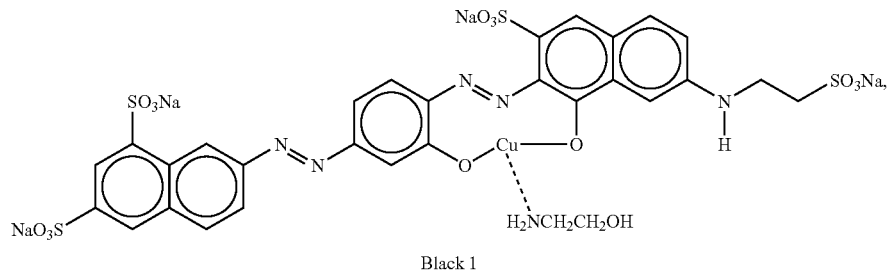

Black 1 the dye "Black 2" of formula

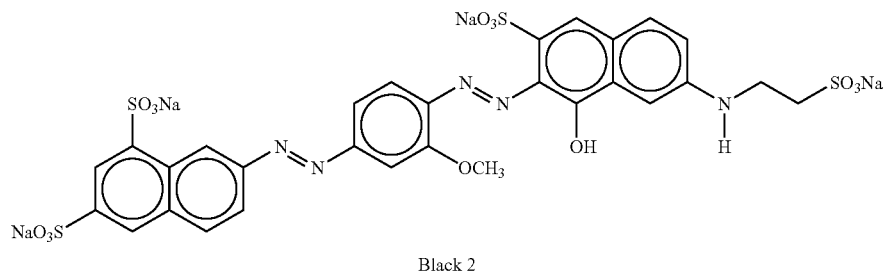

Black 2 the dye "Reactive Black 31" of formula

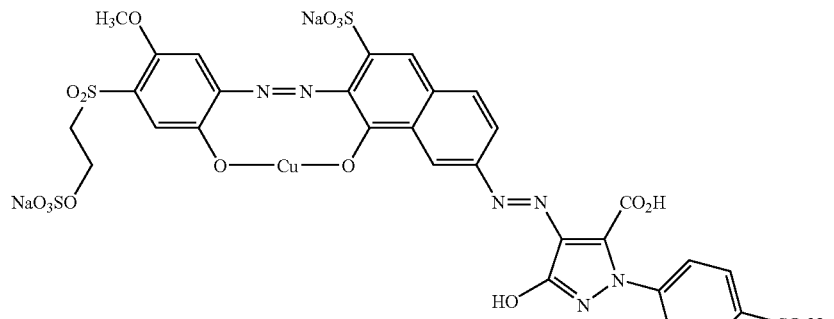

Reactive Black 31 or a mixture of these dyes.

Preferred is an ink set according to the invention consisting of a yellow ink, a magenta ink, a cyan ink and a black ink, which comprises, in said magenta ink, at least one azo dye of general formulas (I) or (II) as first dye component and at least one copper complex azo dye of general formulas (III) or (IV) as second dye component, and, in said black ink, the dye "Black 1", "Black 2", "Reactive Black 31" or a mixture of these dyes.

Especially preferred is an ink set according to the invention consisting of a yellow ink, a magenta ink, a cyan ink and a black ink, which comprises, in said magenta ink, the dye "Magenta H-1", the dye "Magenta H-2" or a mixture of these dyes as first dye component, and the dye "Magenta C-1", the dye "Magenta C-2", the dye "Magenta C-3", the dye "Magenta C-4", the dye "Reactive Red 23" or a mixture of these dyes as second dye component, and, in said black ink, the dye "Black 1", "Black 2", "Reactive Black 31" or a mixture of these dyes.

Recording sheets for high quality ink jet printing generally consist of a support such as for example polyethylene coated paper or voided polyester, into which has been coated an ink-receiving layer on the front side and, optionally, a backing layer on the back side improving the planarity of the printed recording sheet.

In polymer based recording sheets the ink-receiving layer very often consists of a mixture of polymers such as polyvinyl pyrrolidone or carboxymethyl cellulose or of a mixture of these polymers with gelatin. Inks are absorbed relatively slowly into the ink-receiving layer, because absorption depends on the swelling of the ink-receiving layer. These recording sheets are not really suited for photofinishing applications, because this application requires quick drying of the printed recording sheet.

Recording sheets with ink-receiving layers containing nanocrystalline, nanoporous inorganic compounds are better suited for photofinishing applications. In these recording sheets, the deposited ink is absorbed by capillary forces of the nanocrystalline, nanoporous inorganic compounds such as for example AlOOH or $SiO_2$. For ink absorption, the ink-receiving layers do not need to swell.

The magenta inks according to the invention as well as the corresponding ink sets give excellent results on polymer based recording sheets as well as on nanoporous recording sheets.

The inks according to the invention contain, as usual, in addition to the principal component water, water-soluble organic solvents. Such a solvent needs to be compatible with the dyes and the other ingredients of the inks. Neither precipitates are allowed to form nor chemical reactions are allowed to occur. The solvents may be used as single entities or as mixtures. Inks containing the smallest number of different solvents are preferred. These solvents may be present in the inks in amounts of up to 80 percent by weight relative to the total weight of the inks. Amounts as low as possible, up to 30 percent by weight, are preferred in order not to influence drying or dye diffusion behavior negatively. Suitable solvents are for example water-soluble alcohols, water-soluble glycols, higher alcohols, polyalcohols, diglycols, triglycols and polyglycols as well as monoethers and diethers of these compounds and nitrogen containing solvents such as ethanolamine, diethanolamine, triethanolamine, 2-pyrrolidone, octylpyrrolidone, N-methyl-pyrrolid-2-one or 1,3-dimethylimidazolid-2-one.

The inks according to the invention further contain so-called humefactants. Humefactants are organic, water-soluble liquids with high boiling points. They prevent the drying of the inks at the nozzles of the printing head when printing is interrupted for long times. Nearly all solvents with high boiling point mentioned in the preceding paragraph may be used. Glycerol, in amounts of up to 30 percent by weight relative to the total weight of the inks, is preferred. Especially preferred are amounts of up to 15 percent by weight.

The inks according to the invention may further contain metal chelating compounds. These metal chelating compounds may be contained in the inks in amounts of up to 0.5 percent by weight relative to the total weight of the inks. Preferred are amounts of up to 0.3 percent by weight. Ethylene diaminetetraacetic acid and its salts are examples of such a metal chelating compound.

The inks according to the invention may further contain non-ionic and/or anionic surfactants in order to adjust surface tension in the case where the presence of the solvent does not give the required value of surface tension. Cationic surfactants normally may not be used, because they would form precipitates with the anionic dyes. The non-ionic and/or anionic surfactants are preferentially added to the inks in amounts of up to 2 percent by weight relative to the total weight of the inks. Especially preferred are amounts from 0.1 percent by weight to 1.0 percent by weight.

Surfynol-type surfactants (ethoxylated alkynes), in particular Surfynol 465 (available from Air Products and Chemicals, Allentown, USA); Tergitol-type surfactants (ethoxylated alcohols, available from Dow Chemical Company, Midland, USA) and Olin 10 G (available from Olin Corporation, Norwalk, USA) are examples of nonionic surfactants.

Aerosol OT (available from Cytec Industries, West Paterson, USA); Triton X-200 (available from Dow Chemical Company, Midland, USA) and Niaproof 04 (available from Niacet Corporation, Niagara Falls, USA) are examples of nonionic surfactants.

The inks according to the invention further contain biocides in amounts of up to 0.5 percent by weight relative to the total weight of the inks, preferentially in amounts from 0.1 percent by weight to 0.3 percent by weight. These biocides are essential ingredients, because they prevent the degradation of the inks by bacteria, yeasts and moulds, especially in open systems. They determine the shelf live, the transport properties and the storage properties of the inks. Examples of such biocides are Mergal 10 K N, available from Troy Chemical Company, Florham Park, USA, and Proxel GXL, available from Avecia, Manchester, Great Britain.

Each of the yellow ink, the magenta ink, the cyan ink and the black ink of the ink sets according to the invention comprise the dyes in amounts from 0.1 percent by weight to 10 percent by weight relative to the total weight of each ink. Preferred are amounts from 2 percent by weight to 6 percent by weight relative to the total weight of each ink.

The components (with the exception of water) used in the magenta inks according to the invention are listed in Table 1, relative to the total weight of the ink.

TABLE 1

| Component | Percent by weight |
| --- | --- |
| Ethylene glycol | 6.0 |
| Propylene glycol | 3.0 |
| N-methylpyrrolidone | 3.0 |
| Triethanolamine | 2.0 |
| Olin 10G (Surfactant) | 0.1 |
| Surfynol 465 (Surfactant) | 0.2 |
| Mergal K 10 N (Biocide) | 0.1 |

The composition of a typical yellow ink of an ink set according to the invention is listed in Table 2.

TABLE 2

| Component | Percent by weight |
| --- | --- |
| Ethylene glycol | 6.0 |
| Propylene glycol | 3.0 |
| N-methylpyrrolidone | 3.0 |
| Triethanolamine | 2.0 |
| Olin 10G (Surfactant) | 0.1 |
| Surfynol 465 (Surfactant) | 0.2 |
| Mergal K 10 N (Biocide) | 0.1 |
| Dye "Yellow 2" | 2.5 |
| Water | 83.1 |

The dye "Yellow 2" may also be replaced by the dyes "Yellow 1", "Yellow 3" or a mixture of these dyes.

The composition of a typical cyan ink of an ink set according to the invention is listed in Table 3.

TABLE 3

| Component | Percent by weight |
| --- | --- |
| Ethylene glycol | 6.0 |
| Propylene glycol | 3.0 |

TABLE 3-continued

| Component | Percent by weight |
| --- | --- |
| N-methylpyrrolidone | 3.0 |
| Triethanolamine | 2.0 |
| Olin 10G (Surfactant) | 0.1 |
| Surfynol 465 (Surfactant) | 0.2 |
| Mergal K 10 N (Biocide) | 0.1 |
| Dye "Direct Blue 199" | 3.0 |
| Water | 82.6 |

The cyan dye Direct Blue 199 may be replaced by other suitable copper phthalocyanine dyes or by mixtures of copper phthalocyanine dyes.

The composition of a typical black ink of an ink set according to the invention is listed in Table 4.

TABLE 4

| Component | Percent by weight |
| --- | --- |
| Ethylene glycol | 6.0 |
| Propylene glycol | 3.0 |
| N-methylpyrrolidone | 3.0 |
| Olin 10G (Surfactant) | 0.1 |
| Surfynol 465 (Surfactant) | 0.2 |
| Mergal K 10 N (Biocide) | 0.1 |
| Dye "Black 1" | 4.5 |
| Water | 83.1 |

The dye "Black 1" may be replaced by the dyes "Black 2", "Reactive Black 31" or a mixture of these dyes.

The present invention will be illustrated in more detail by the following examples without limiting the scope of the invention in any way.

Image Preparation

For the determination of color coordinates, magenta wedges with 10 steps, wherein the number of droplets decreases linearly from step 1 (100%) to step 10 (10%), were printed with an ink jet printer Canon BJC 8500 onto the recording sheets IJP1.GP7 and DTN.GP9, both available from ILFORD Imaging Switzerland GmbH, Fribourg, Switzerland, IrisPRO Semi-Matte, available from Creo Inc., Burnaby, Canada, and HP Premium, available from Hewlett-Packard Company, Palo Alto, USA, using inks according to the invention.

IJP1.GP7 and IrisPRO Semi-Matte are polymer based recording sheets for ink jet printing, DTN.GP9 is a nanoporous recording sheet and HP Premium is a coated paper.

For the determination of light stability and the stability against ambient air, magenta patches with 95% ink load were printed onto the recording sheets IJP1.GP7, DTN.GP9, IrisPRO Semi-Matte and HP Premium.

For the determination of dye diffusion, squares of 1 cm$^2$ containing a finely graded grid were printed onto the recording sheets IJP1.GP7, DTN.GP9, IrisPRO Semi-Matte and HP Premium, wherein the squares of this grid had a length of 8 pixels and the lines a width of 2 pixels. The printed samples were dried for 24 hours in air of 59% relative humidity. Afterwards, dye diffusion was determined in the printed samples.

Tests

The following properties were determined on the recording sheets printed with the magenta inks according to the invention:

Light Stability

The printed samples were irradiated in an ATLAS Ci35A Weather-O-Meter® with a 6500 W Xenon lamp until a total illumination of 10 kJoule/cm$^2$ was reached. The density difference of the samples before and after irradiation is an indication of the light stability of the dyes.

Color Coordinates

The color coordinates (L*a*b*-values) were measured on printed samples using a Spectrolino™ spectrometer, available from Gretag AG, Regensdorf, Switzerland.

Dye Diffusion

The optical density of the colored squares was measured using a densitometer Spectrolino™, available from Gretag Macbeth, Regensdorf, Switzerland. The printed samples were then stored for 7 days in a climatic test cabinet of Heräus at a temperature of 40° C. and relative humidity of 80%. After this storage period the samples were remeasured. The percent density differences before and after storage are an indication of the amount of dye diffusion. A density increase corresponds to dye diffusion, because the unprinted regions of the grid are getting colored by the diffusing dye. Therefore, the measured integral density increases.

Stability in Contact with Ambient Air

The optical density of the magenta patches was measured using a densitometer Spectrolino™, available from Gretag Macbeth, Regensdorf, Switzerland. The printed samples were then stored in the dark for 7 days in a closed cupboard under moderate circulation of ambient air at a temperature of 20° C. and relative humidity of 50%. Afterwards the samples were remeasured. The percent density differences are an indication of the dye loss of the samples exposed to ambient air in the dark.

The present invention will be illustrated in more detail by the following examples without limiting the scope of the invention in any way.

EXAMPLES

Example 1

The components (with the exception of the dyes) used in the magenta inks are listed in Table 5, relative to the total weight of the ink.

TABLE 5

| Component | Percent by weight |
| --- | --- |
| Ethylene glycol | 6.0 |
| Propylene glycol | 3.0 |
| N-methylpyrrolidone | 3.0 |
| Triethanolamine | 2.0 |
| Olin 10G (Surfactant) | 0.1 |
| Surfynol 465 (Surfactant) | 0.2 |
| Mergal K 10 N (Biocide) | 0.1 |

Olin 10G is available from Olin Corporation, Norwalk, USA, Surfynol 465 is available from Air Products and Chemicals, Allentown, USA, and Mergal K 10 N is available from Troy Chemical Company, Florham Park, USA.

The quantities of the magenta dyes were adjusted for each ink in such a way that a similar maximum density was obtained. The quantities indicated in the following tables are in per-cent by weight relative to the total quantity of the magenta dyes in each ink.

The mixing ratios of the magenta dyes used are listed in Table 6. The magenta ink M-1.1 comprises only the magenta dye "Reactive Red 23", the magenta ink M-1.5 comprises only the magenta dye "Magenta H-1". The magenta inks M-1.2, M-1.3 and M-1.4 each comprise a mixture of these two dyes.

TABLE 6

| Ink | Part of Dye "Reactive Red 23" (percent by weight) | Part of Dye "Magenta H-1" (percent by weight) |
|---|---|---|
| M-1.1 | 100 | 0 |
| M-1.2 | 75 | 25 |
| M-1.3 | 50 | 50 |
| M-1.4 | 25 | 75 |
| M-1.5 | 0 | 100 |

Example 2

The dye "Reactive Red 23" in the inks of example 1 was replaced by the dye "Magenta C-1".

The mixing ratios of the magenta dyes used are listed in Table 7. The magenta ink M-2.1 comprises only the magenta dye "Magenta C-1", the magenta ink M-2.5 comprises only the magenta dye "Magenta H-1". The magenta inks M-2.2, M-2.3 and M-2.4 each comprise a mixture of these two dyes.

TABLE 7

| Ink | Part of Dye "Magenta C-1" (percent by weight) | Part of Dye "Magenta H-1" (percent by weight) |
|---|---|---|
| M-2.1 | 100 | 0 |
| M-2.2 | 75 | 25 |
| M-2.3 | 50 | 50 |
| M-2.4 | 25 | 75 |
| M-2.5 | 0 | 100 |

Example 3

The dye "Reactive Red 23" in the inks of example 1 was replaced by the dye "Magenta C-2" and the dye "Magenta H-1" was replaced by the dye "Magenta H-2".

The mixing ratios of the magenta dyes used are listed in Table 8. The magenta ink M-3.1 comprises only the magenta dye "Magenta C-2", the magenta ink M-3.5 comprises only the magenta dye "Magenta H-2". The magenta inks M-3.2, M-3.3 and M-3.4 each comprise a mixture of these two dyes.

TABLE 8

| Ink | Part of Dye "Magenta C-2" (percent by weight) | Part of Dye "Magenta H-2" (percent by weight) |
|---|---|---|
| M-3.1 | 100 | 0 |
| M-3.2 | 75 | 25 |
| M-3.3 | 50 | 50 |
| M-3.4 | 25 | 75 |
| M-3.5 | 0 | 100 |

Example 4

The dye "Reactive Red 23" in the inks of example 1 was replaced by the dye "Magenta C-3" and the dye "Magenta H-1" was replaced by the dye "Magenta H-2".

The mixing ratios of the magenta dyes used are listed in Table 9. The magenta ink M-4.1 comprises only the magenta dye "Magenta C-3", the magenta ink M-4.5 comprises only the magenta dye "Magenta H-2". The magenta inks M-4.2, M-4.3 and M-4.4 each comprise a mixture of these two dyes.

TABLE 9

| Ink | Part of Dye "Magenta C-3" (percent by weight) | Part of Dye "Magenta H-2" (percent by weight) |
|---|---|---|
| M-4.1 | 100 | 0 |
| M-4.2 | 75 | 25 |
| M-4.3 | 50 | 50 |
| M-4.4 | 25 | 75 |
| M-4.5 | 0 | 100 |

Results

The measured values of L*a*b* at maximum density of the inks of example 1 printed onto the recording sheet IJP1.GP7 are listed in Table 10. Chroma C is an indication of brilliance and is defined in the following way:

$$C = \sqrt{a^{*2} + b^{*2}}$$

TABLE 10

| Ink | L* | a* | b* | C |
|---|---|---|---|---|
| M-1.1 | 44.24 | 67.94 | −5.53 | 68 |
| M-1.2 | 44.55 | 70.77 | −6.93 | 71 |
| M-1.3 | 45.55 | 73.57 | −8.06 | 74 |
| M-1.4 | 46.67 | 76.87 | −9.06 | 77 |
| M-1.5 | 46.40 | 82.15 | −6.30 | 82 |

The values of L*a*b* at maximum density of the inks of example 1 on the other recording sheets are similar.

The measured values of L*a*b* at maximum density are listed in Table 11 for the inks of example 2 printed onto the recording sheet DTN.GP9.

TABLE 11

| Ink | L* | a* | b* | C |
|---|---|---|---|---|
| M-2.1 | 44.45 | 67.98 | −27.78 | 73 |
| M-2.2 | 45.62 | 70.47 | −24.87 | 75 |
| M-2.3 | 46.10 | 73.44 | −20.74 | 76 |
| M-2.4 | 46.14 | 77.75 | −16.02 | 79 |
| M-2.5 | 46.69 | 82.00 | −8.41 | 82 |

The values of L*a*b* at maximum density of the inks of example 2 on the other recording sheets are similar.

The measured values of L*a*b* at the maximum density are listed in Table 12 for the inks of example 3 printed onto the recording sheet DTN.GP9.

TABLE 12

| Ink | L* | a* | b* | C |
|---|---|---|---|---|
| M-3.1 | 46.71 | 67.21 | −24.52 | 72 |
| M-3.2 | 45.62 | 71.11 | −18.67 | 74 |
| M-3.3 | 46.02 | 73.99 | −11.64 | 75 |
| M-3.4 | 46.94 | 77.28 | −3.17 | 77 |
| M-3.5 | 48.94 | 80.92 | 9.78 | 82 |

The values of L*a*b* at maximum density of the inks of example 3 on the other recording sheets are similar.

The measured values of L*a*b* at maximum density are listed in Table 13 for the inks of example 4 printed onto the recording sheet DTN.GP9.

TABLE 13

| Ink | L* | a* | b* | C |
|---|---|---|---|---|
| M-4.1 | 49.50 | 66.09 | −9.46 | 67 |
| M-4.2 | 48.29 | 70.63 | −7.25 | 71 |
| M-4.3 | 47.47 | 74.24 | −2.85 | 74 |
| M-4.4 | 47.90 | 77.76 | 1.99 | 78 |
| M-4.5 | 48.81 | 80.70 | 9.80 | 81 |

The values of L*a*b* at maximum density of the inks of example 4 on the other recording sheets are similar.

The results in Tables 10 to 13 show that the brilliance (chroma) increases with increasing amounts of the dye with the incorporated H-acid moiety in its molecular structure.

The results of light stability testing are listed in Table 14 for the inks of example 1 printed onto the recording sheets DTN.GP9, JP1.GP7, IrisPRO Semi-Matte and HP Premium.

TABLE 14

| | Density loss in percent | | | |
|---|---|---|---|---|
| Ink | Recording Sheet DTN.GP9 | Recording Sheet IJP1.GP7 | Recording Sheet IrisPRO Semi-Matte | Recording Sheet HP Premium |
| M-1.1 | 6 | 7 | 6 | 6 |
| M-1.2 | 9 | 12 | 12 | 9 |
| M-1.3 | 10 | 16 | 19 | 12 |
| M-1.4 | 11 | 22 | 26 | 14 |
| M-1.5 | 11 | 26 | 29 | 19 |

The results in Table 14 show that the light stability of magenta patches containing the magenta dyes "Reactive Red 23" and "Magenta H-1" either alone or as mixtures is very good, in particular on the nanoporous recording sheet DTN.GP9. The highest measured density loss of 29% on the recording sheet IrisPRO Semi-Matte corresponds to a life expectancy of 4 years under ambient lighting conditions (500 lux).

The results of light stability testing are listed in Table 15 for the inks of example 2 printed onto the recording sheets DTN.GP9, JP1.GP7, IrisPRO Semi-Matte and HP Premium.

TABLE 15

| | Density loss in percent | | | |
|---|---|---|---|---|
| Ink | Recording Sheet DTN.GP9 | Recording Sheet IJP1.GP7 | Recording Sheet IrisPRO Semi-Matte | Recording Sheet HP Premium |
| M-2.1 | 10 | 8 | 16 | 7 |
| M-2.2 | 12 | 14 | 22 | 10 |
| M-2.3 | 12 | 20 | 25 | 13 |
| M-2.4 | 12 | 24 | 30 | 17 |
| M-2.5 | 10 | 27 | 29 | 19 |

The results in Table 15 show that the light stability of magenta patches containing the magenta dyes "Magenta C-1" and "Magenta H-1" either alone or as mixtures is very good, in particular on the nanoporous recording sheet DTN.GP9. The highest measured density loss of 30% on the recording sheet IrisPRO Semi-Matte corresponds to a life expectancy of 4 years under ambient lighting conditions (500 lux).

The results of light stability testing are listed in Table 16 for the inks of example 3 printed onto the recording sheets DTN.GP9, JP1.GP7, IrisPRO Semi-Matte and HP Premium.

TABLE 16

| | Density loss in percent | | | |
|---|---|---|---|---|
| Ink | Recording Sheet DTN.GP9 | Recording Sheet IJP1.GP7 | Recording Sheet IrisPRO Semi-Matte | Recording Sheet HP Premium |
| M-3.1 | 5 | 4 | 5 | 4 |
| M-3.2 | 10 | 10 | 11 | 11 |
| M-3.3 | 10 | 16 | 14 | 17 |
| M-3.4 | 11 | 20 | 22 | 26 |
| M-3.5 | 11 | 24 | 27 | 35 |

The results in Table 16 show that the light stability of magenta patches containing the magenta dyes "Magenta C-2" and "Magenta H-2" either alone or as mixtures is very good, in particular on the nanoporous recording sheet DTN.GP9. The highest measured density loss of 35% on the recording sheet HP Premium corresponds to a life expectancy of 3.5 years under ambient lighting conditions (500 lux).

The results of light stability testing are listed in Table 17 for the inks of example 4 printed onto the recording sheets DTN.GP9, JP1.GP7, IrisPRO Semi-Matte and HP Premium.

TABLE 17

| | Density loss in percent | | | |
|---|---|---|---|---|
| Ink | Recording Sheet DTN.GP9 | Recording Sheet IJP1.GP7 | Recording Sheet IrisPRO Semi-Matte | Recording Sheet HP Premium |
| M-4.1 | 2 | 8 | 13 | 2 |
| M-4.2 | 7 | 12 | 16 | 6 |
| M-4.3 | 7 | 15 | 17 | 11 |
| M-4.4 | 11 | 19 | 22 | 21 |
| M-4.5 | 13 | 20 | 23 | 30 |

The results in Table 17 show that the light stability of magenta patches containing the magenta dyes "Magenta C-3" and "Magenta H-2" either alone or as mixtures is very good, in particular on the nanoporous recording sheet DTN.GP9. The highest measured density loss of 30% on the recording sheet HP Premium corresponds to a life expectancy of 4 years under ambient lighting conditions (500 lux).

The results of testing of dye diffusion are listed in Table 18 for the inks of example 2 printed onto the recording sheets DTN.GP9, JP1.GP7, IrisPRO Semi-Matte and HP Premium.

TABLE 18

| | Density increase in percent | | | |
|---|---|---|---|---|
| Ink | Recording Sheet DTN.GP9 | Recording Sheet IJP1.GP7 | Recording Sheet IrisPRO Semi-Matte | Recording Sheet HP Premium |
| M-2.1 | 8 | 2 | 3 | 0 |
| M-2.2 | 10 | 6 | 9 | −2 |
| M-2.3 | 9 | 7 | 3 | 3 |
| M-2.4 | 5 | 12 | 6 | 2 |
| M-2.5 | 2 | 11 | 1 | −2 |

The results in Table 18 show that the diffusion behavior of the dyes "Magenta C-1" and "Magenta H-1" on the four recording sheets is different. However, dye diffusion is in all cases so small that the images may be stored under humid conditions.

The results of testing of dye diffusion are listed in Table 19 for the inks of example 3 printed onto the recording sheets DTN.GP9, JP1.GP7, IrisPRO Semi-Matte and HP Premium.

TABLE 19

| Ink | Density increase in percent | | | |
| --- | --- | --- | --- | --- |
| | Recording Sheet DTN.GP9 | Recording Sheet IJP1.GP7 | Recording Sheet IrisPRO Semi-Matte | Recording Sheet HP Premium |
| M-3.1 | 26 | 7 | 9 | 2 |
| M-3.2 | 16 | 4 | 9 | −2 |
| M-3.3 | 17 | 11 | 7 | 2 |
| M-3.4 | 14 | 9 | 6 | 0 |

The results in Table 19 show that the diffusion behavior of the dyes "Magenta C-2" and "Magenta H-1" on the four recording sheets is different. However, dye diffusion is so small on the recording sheets JP1.GP7, IrisPRO Semi-Matte and HP Premium that the images may be stored under humid conditions. The bad diffusion behavior of the dye "Magenta C-2" on the nanoporous recording sheet DTN.GP9 is improved by an admixture of dye "Magenta H-2".

The results of testing of dye diffusion are listed in Table 20 for the inks of example 4 printed onto the recording sheets DTN.GP9, JP1.GP7, IrisPRO Semi-Matte and HP Premium.

TABLE 20

| Ink | Density increase in percent | | | |
| --- | --- | --- | --- | --- |
| | Recording Sheet DTN.GP9 | Recording Sheet IJP1.GP7 | Recording Sheet IrisPRO Semi-Matte | Recording Sheet HP Premium |
| M-4.1 | 18 | 7 | 12 | 2 |
| M-4.2 | 9 | 10 | 4 | 3 |
| M-4.3 | 23 | 10 | 1 | −2 |
| M-4.4 | 24 | 11 | 3 | 3 |
| M-4.5 | 17 | 17 | 3 | 3 |

The results in Table 20 show that the diffusion behavior of the dyes "Magenta C-3" and "Magenta H-2" on the four recording sheets is different. However, dye diffusion is so small on the recording sheets JP1.GP7, IrisPRO Semi-Matte and HP Premium that the images may be stored under humid conditions. The bad diffusion behavior of the dye "Magenta C-3" on the nanoporous recording sheet DTN.GP9 is improved by an admixture of dye "Magenta H-2".

The density losses obtained during the exposure to ambient are listed in Table 21 for the inks of example 1 printed onto the recording sheet DTN.GP9.

TABLE 21

| Ink | Density loss in percent Recording Sheet DTN.GP9 |
| --- | --- |
| M-1.1 | 8 |
| M-1.2 | 5 |
| M-1.3 | 5 |
| M-1.4 | 3 |
| M-1.5 | 2 |

The results in Table 21 show that the admixture of the dye "Reactive Red 23" to the dye "Magenta H-1" improves the stability of the samples exposed to ambient air.

The density losses obtained during the exposure to ambient are listed in Table 22 for the inks of example 2 printed onto the recording sheet DTN.GP9.

TABLE 22

| Ink | Density loss in percent Recording Sheet DTN.GP9 |
| --- | --- |
| M-2.1 | 5 |
| M-2.2 | 4 |
| M-2.3 | 3 |
| M-2.4 | 3 |
| M-2.5 | 2 |

The results in Table 22 show that the admixture of the dye "Magenta C-1" to the dye "Magenta H-1" improves the stability for the samples exposed to ambient air.

The density losses obtained during the exposure to ambient are listed in Table 23 for the inks of example 3 printed onto the recording sheet DTN.GP9.

TABLE 23

| Ink | Density loss in percent Recording Sheet DTN.GP9 |
| --- | --- |
| M-3.1 | 8 |
| M-3.2 | 7 |
| M-3.3 | 5 |
| M-3.4 | 3 |
| M-3.5 | 1 |

The results in Table 23 show that the admixture of the dye "Magenta C-2" to the dye "Magenta H-2" improves the stability for the samples exposed to ambient air.

The density losses obtained during the exposure to ambient are listed in Table 24 for the inks of example 4 printed onto the recording sheet DTN.GP9.

TABLE 24

| Ink | Density loss in percent Recording Sheet DTN.GP9 |
| --- | --- |
| M-4.1 | 2 |
| M-4.2 | 2 |
| M-4.3 | 1 |
| M-4.4 | 1 |
| M-4.5 | 1 |

The results in Table 24 show that all mixtures of the dyes "Magenta C-3" and "Magenta H-2" show a good stability for the samples exposed to ambient air.

Taken together, the examples show that magenta patches showing high brilliance as well as good light fastness may be printed with magenta inks comprising a mixture of dyes with an incorporated H-acid moiety in their molecular structure and of copper complex azo dyes.

On the recording sheet IJP1.GP7 the magenta inks M-1.3, M-2.3, M-3.3 and M-4.3 generate magenta patches showing the best compromise between brilliance (chroma) and light fastness.

Finally, variations from the examples given herein are possible in view of the above disclosure. Therefore, although the invention has been described with reference to certain preferred embodiments, it will be appreciated that other dyes and ink sets may be devised, which are nevertheless within the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

The invention claimed is:

1. Ink set for ink jet printing consisting of at least one yellow ink, at least one magenta ink, at least one cyan ink and at least one black ink, wherein said magenta ink contains, as first dye component, at least one dye of formula (I),

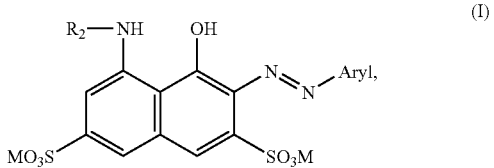

(I)

wherein
M represents hydrogen, a metal atom or ammonium;
$R_2$ represents $COD_1$, where
  $D_1$ represents unsubstituted or substituted alkyl, where the substituents are selected from the group consisting of $OCH_3$ and COOM;
  unsubstituted phenyl or phenyl substituted with $CH_3$, Cl, Br, OH or COOM
  or
  represents $SO_2D_2$, here
  $D_2$ represents unsubstituted alkyl, unsubstituted phenyl or phenyl substituted with $CH_3$, F, Cl or Br
and
Aryl represents unsubstituted phenyl or phenyl substituted with $CH_3$, Cl, Br, COOM or $SO_3M$ or unsubstituted naphthyl or naphthyl substituted with COOM or $SO_3M$,
or
of formula (II)

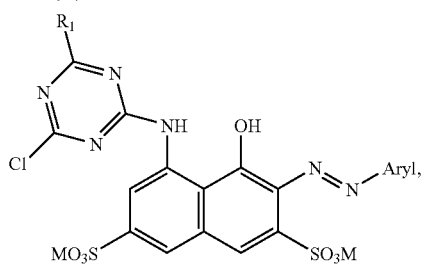

(II)

wherein
M represents hydrogen, a metal atom or ammonium;
$R_1$ represents $NR_3R_4$, where
  $R_3$ and $R_4$ independently represent hydrogen; alkyl, substituted alkyl, where the substituents are selected from the group consisting of OH, $OCH_3$, COOM and $SO_3M$; aralkyl; unsubstituted aryl or substituted aryl, where the substituents are selected from the group consisting of $OCH_3$, Cl, Br, COOM and $SO_3M$;
  or
  represents $OR_5$, where
  $R_5$ represents hydrogen or alkyl;
  or
  represents $SR_6$, where
  $R_6$ represents alkyl or alkyl substituted with COOM, OH or $SO_3M$
and
Aryl represents unsubstituted phenyl or phenyl substituted with $CH_3$, Cl, Br, COOM or $SO_3M$ or unsubstituted naphthyl or naphthyl substituted with COOM or $SO_3M$, and as second dye component, at least one copper complex azo dye of formula (III),

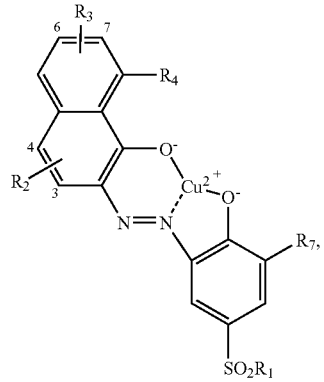

(III)

or of general formula (IV)

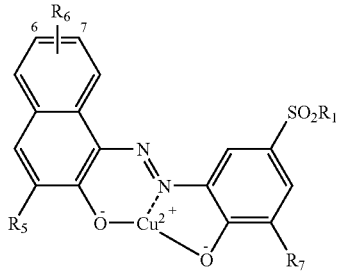

(IV)

wherein
M represents hydrogen, a metal atom or optionally substituted ammonium;
$R_1$ represents alkyl with 1 to 4 carbon atoms, substituted alkyl with 2 to 4 carbon atoms, where the substituents are selected from the group consisting of OH; or alkenyl with 2 to 4 carbon atoms;
$R_2$ represents hydrogen or $SO_3M$;
$R_3$ represents hydrogen, $SO_3M$, $NH_2$, $NHCOD_1$, where $D_1$ represents unsubstituted or substituted alkyl with 1 to 6 carbon atoms, where the substituents are selected from the group consisting of COOM, Cl and Br; unsubstituted phenyl or phenyl substituted with $CH_3$, Cl, Br, OH, COOM or $SO_3M$; or $NHSO_2D_2$, where $D_2$ represents unsubstituted alkyl with 1 to 6 carbon atoms, unsubstituted phenyl or phenyl substituted with $CH_3$, F, Cl or Br;
$R_4$ represents hydrogen, $SO_3M$, $NH_2$, $NHSO_2D_3$, where $D_3$ represents alkyl with 1 to 6 carbon atoms; unsubstituted phenyl or phenyl substituted with $CH_3$, F, Cl or Br;
$R_5$ represents hydrogen, $SO_3M$, COOM or $COND_4D_5$, where $D_4$ and $D_5$ independently represent hydrogen, unsubstituted or substituited alkyl with 1 to 6 carbon atoms, where the substituents are selected from the group consisting of $OCH_3$, $OC_2H_5$, iso-$OC_3H_7$ and OH;
$R_6$ represents hydrogen or $SO_3M$
and
$R_7$ represents hydrogen or $SO_3M$.

2. Ink set according to claim 1, wherein the ratio of the azo dyes of formulas (I) or (II) and the copper complex azo dyes of formula (III) or (IV) in said magenta ink is from 1:100 by weight to 100:1 by weight.

3. Ink set according to claim 1, wherein said magenta ink contains, as first dye component, the dye "Magenta H-1" of formula

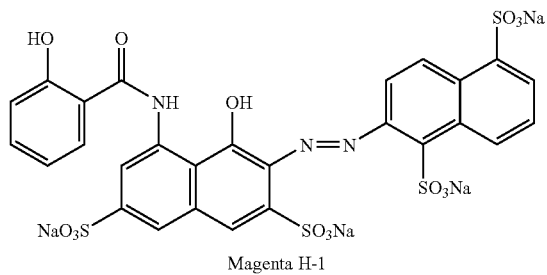

Magenta H-1 or the dye "Magenta H-2" of formula

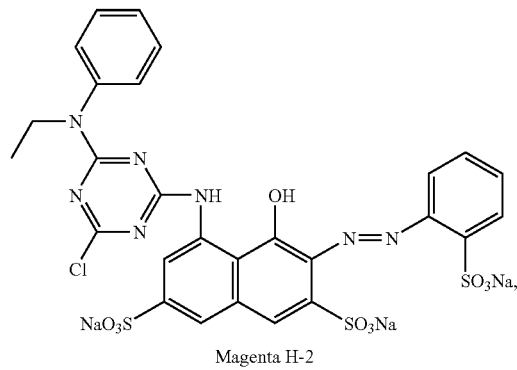

Magenta H-2 or a mixture of these dyes,
and, as second dye component,
the copper complex dye "Magenta C-1" of formula

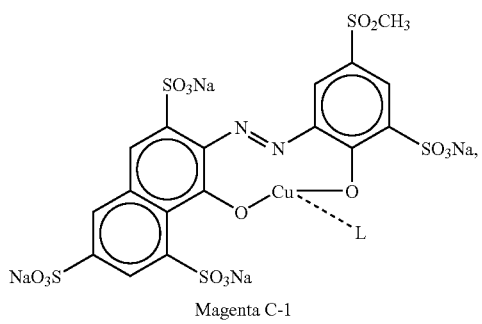

Magenta C-1 wherein
L represents a copper ligand,
the copper complex azo dye "Magenta C-2" of formula

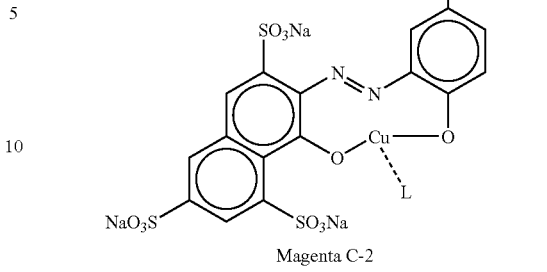

Magenta C-2 wherein
L represents a copper ligand,
the copper complex azo dye "Magenta C-3" of formula

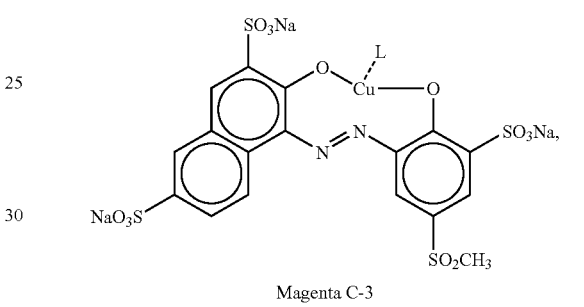

Magenta C-3 the copper complex azo dye "Magenta C-4" of formula

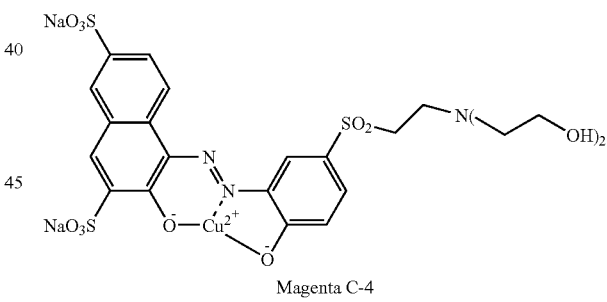

Magenta C-4 or a mixture of these dyes.

4. Ink set according to claim 1, wherein said yellow ink contains at least one dye of formula (V)

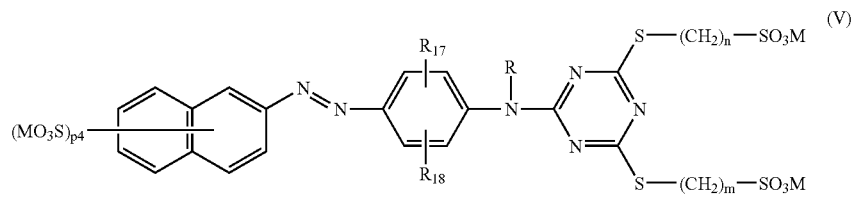

wherein
R represents hydrogen or alkyl having from 1 to 6 carbon atoms;
M represents hydrogen or a metal atom or ammonium optionally substituted by alkyl, alkoxyalkyl or hydroxyalkyl;
$R_{17}$, $R_{18}$ independently represent hydrogen, alkyl or alkoxy each having from 1 to 3 carbon atoms;
$p_4$ is from 1 to 3 and the sulfo group is in position 1, 4, 5, 6, 7 or 8 in the case where $p_4$ is equal to 1; the sulfo groups are in positions 4 and 8, 5 and 7, 6 and 8 or 1 and 5 in the case where $p_4$ is equal to 2; or the sulfo groups are in positions 3, 6 and 8 or 4, 6 and 8 in the case where $p_4$ is equal to 3
and
n, m are each independently from 2 to 6,
or of formula (VI),

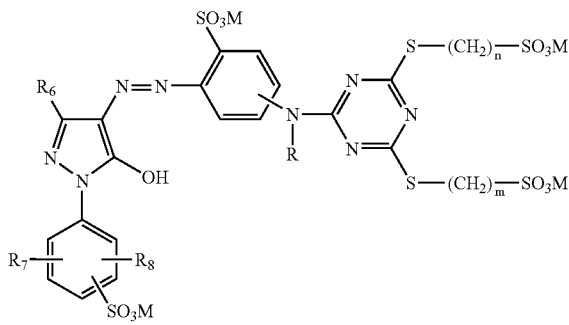

(VI)

wherein
R represents hydrogen or alkyl with 1 to 6 carbon atoms;
M represents hydrogen or a metal atom or optionally substituted ammonium;
$R_6$ represents $CH_3$ or COOM;
$R_7$, $R_8$ independently represent hydrogen, Cl, Br or $CH_3$
and
n, m are each independently from 2 to 6.

5. Ink set according to claim 4, wherein the yellow ink contains the dye "Yellow 1" of formula

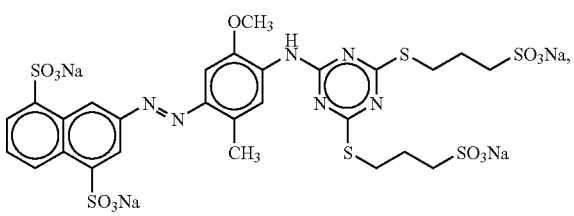

Yellow 1 the dye "Yellow 2" of formula

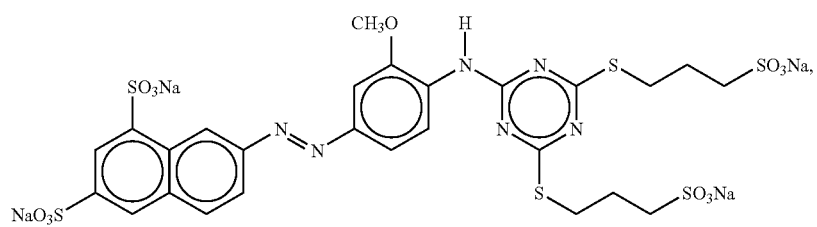

Yellow 2 the dte "Yellow 3" of formula

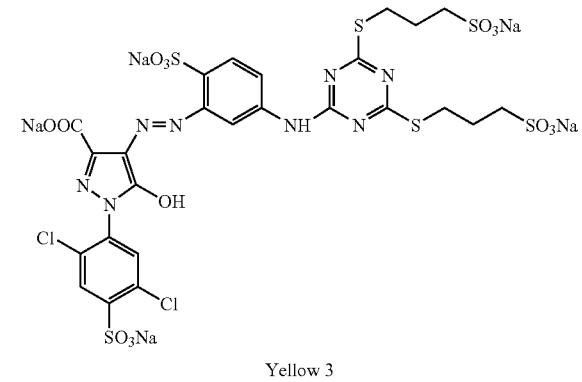

Yellow 3 or a mixture of these dyes.

6. Ink set according to claim 1, wherein said cyan ink contains at least one copper phthalocyanine dye.

7. Ink set according to claim 6, wherein the copper phthalocyanine dye is "Direct Blue 199" of formula

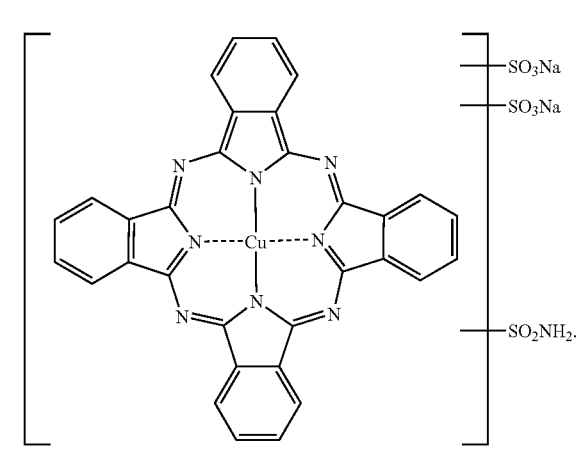

Direct Blue 199

8. Ink set according to claim 1, wherein said black ink contains the dye "Black 1" of formula

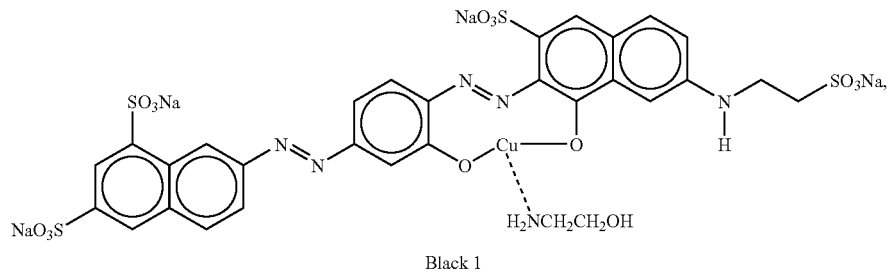
Black 1 the dye "Black 2" of formula

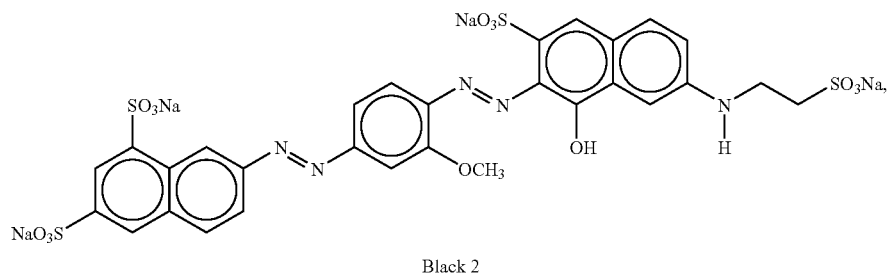
Black 2 the dye "Reactive Black 31" of formula

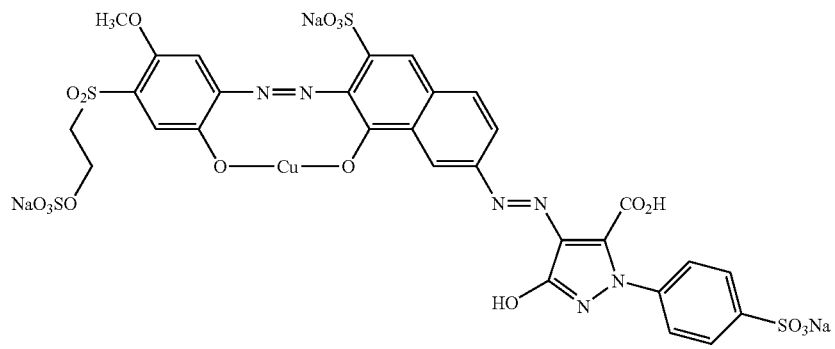
Reactive Black 31 or a mixture of these dyes.

9. Ink set according to claim 1, wherein said yellow ink, said magenta ink, said cyan ink and said black ink each contain the dyes in amounts of from 0.1 percent by weight to 10 percent by weight relative to the total weight of each ink.

10. Ink set for ink jet printing comprised of at least one yellow ink, at least one magenta ink, at least one cyan ink and at least one black ink, wherein said yellow ink contains the dye "Yellow 1" of formula

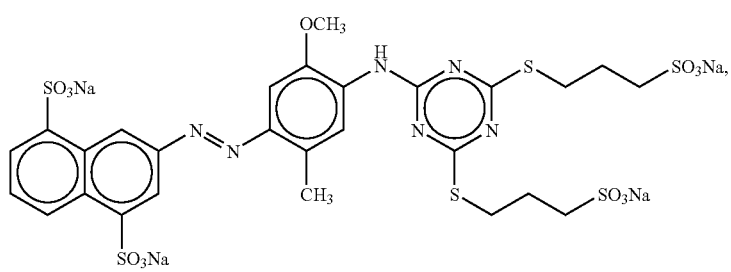
Yellow 1 or the dye "Yellow 2" of formula

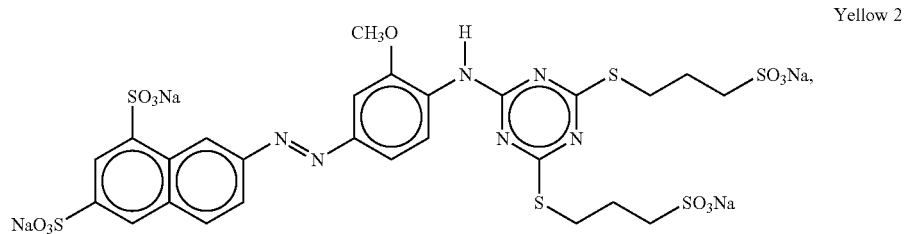
Yellow 2 or the dye "Yellow 3" of formula

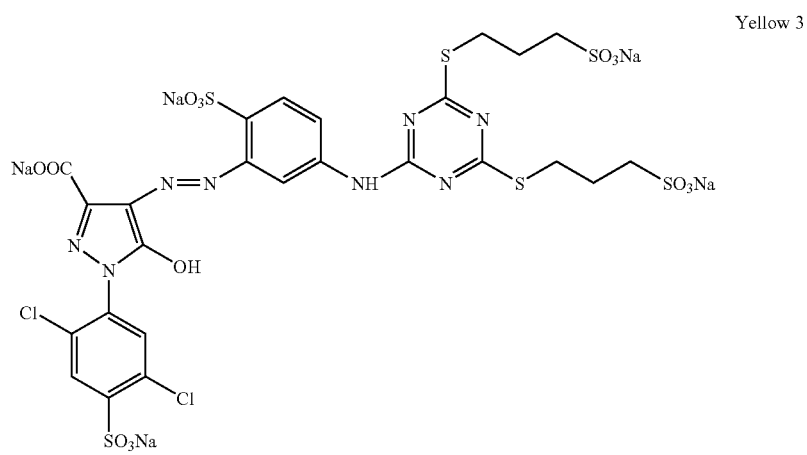
Yellow 3 or a mixture of these dyes;
wherein said magenta ink contains, as first dye component, the dye "Magenta H-1" of formula

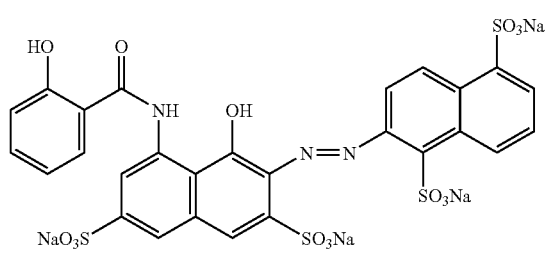
Magenta H-1 or the dye "Magenta H-2" of formula

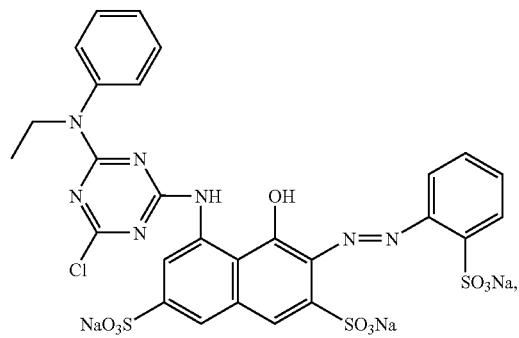

or a mixture of these dyes,
and, as second dye component, the copper complex dye "Magenta C-1" of formula

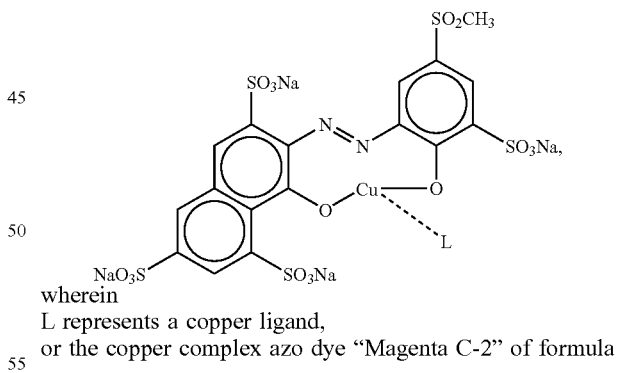
Magenta C-1 wherein
L represents a copper ligand,
or the copper complex azo dye "Magenta C-2" of formula

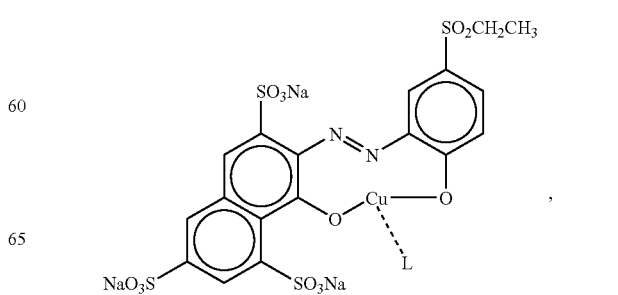
Magenta C-2 or the copper complex azo dye "Magenta C-3" of formula

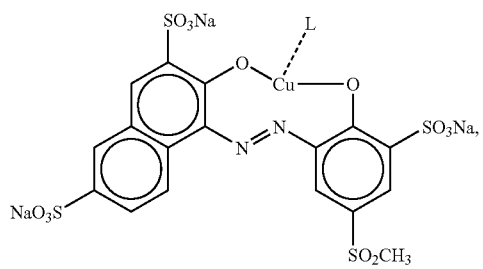

Magenta C-3 wherein

L represents a copper ligand, or the copper complex azo dye "Magenta C-4" of formula

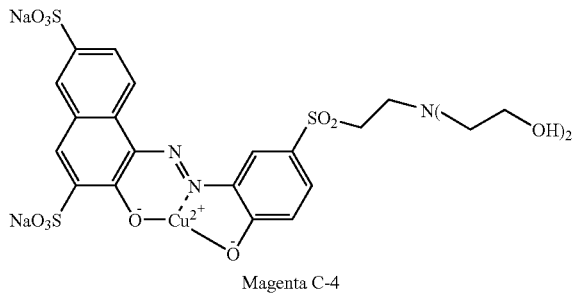

Magenta C-4 or the copper complex azo dye "Reactive Red 23" of formula

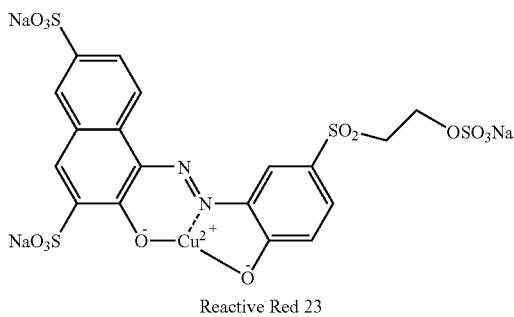

Reactive Red 23 or a mixture of these dyes;
wherein said cyan ink contains the dye "Direct Blue 199" of formula Direct Blue 199 and
wherein said black ink contains the dye "Black 1" of formula

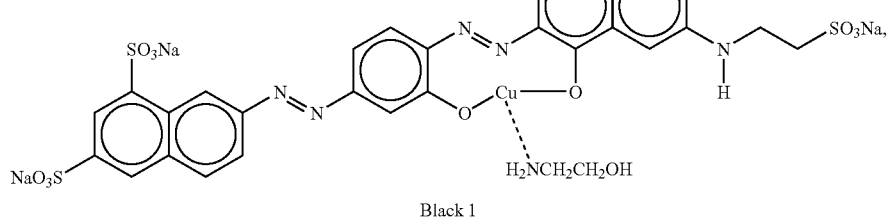

Black 1 or the dye "Black 2" of formula

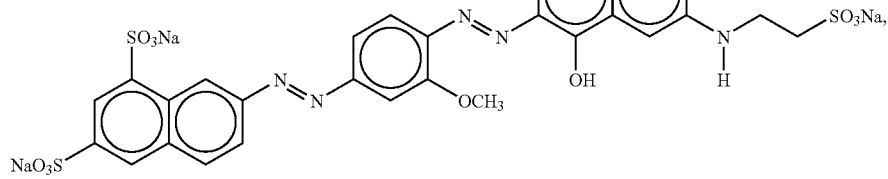

Black 2 or the dye "Reactive Black 31" of formula
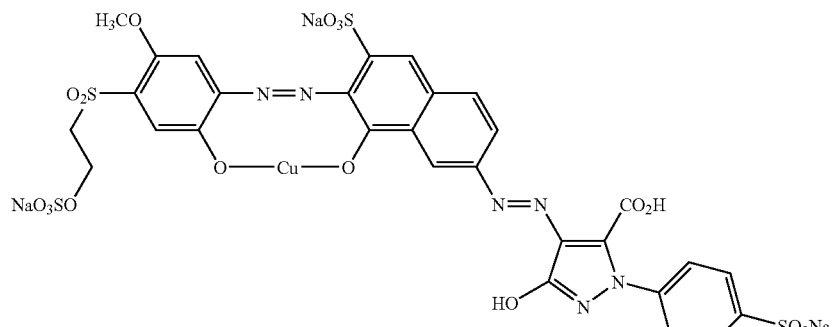
Reactive Black 31
or a mixture of these dyes.
* * * * *